(12) United States Patent
Lu

(10) Patent No.: US 12,737,011 B2
(45) Date of Patent: Sep. 15, 2026

(54) SUPPORT FRAME

(71) Applicant: Qisda Corporation, Taoyuan City (TW)

(72) Inventor: Kuang-Heng Lu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 172 days.

(21) Appl. No.: 18/943,843

(22) Filed: Nov. 11, 2024

(65) Prior Publication Data

US 2025/0172974 A1 May 29, 2025

(30) Foreign Application Priority Data

Nov. 28, 2023 (CN) ......................... 202311601546.8

(51) Int. Cl.
*G06F 1/16* (2006.01)
*H05K 5/00* (2025.01)
*H05K 7/00* (2006.01)

(52) U.S. Cl.
CPC .................................... *G06F 1/166* (2013.01)

(58) Field of Classification Search
CPC ....... G06F 1/166; G06F 1/1633; G06F 1/1681
See application file for complete search history.

(56) References Cited

U.S. PATENT DOCUMENTS 7,715,190 B2 * 5/2010 Tang ..................... G06F 1/1616 361/679.55
7,746,636 B2 * 6/2010 Tang ....................... G06F 1/166 361/679.55
7,855,883 B2 * 12/2010 Tang ..................... G06F 3/0208 361/679.55
8,081,446 B2 * 12/2011 Hsu ....................... G06F 1/1616 361/679.55
8,390,995 B2 * 3/2013 Wang ...................... G06F 1/166 361/679.55
8,792,237 B2 * 7/2014 Guo ...................... G06F 1/1681 361/679.55
8,929,067 B2 * 1/2015 Wu ......................... G06F 1/166 361/679.55

(Continued)

FOREIGN PATENT DOCUMENTS

CN 214511424 10/2021
CN 216658021 6/2022

*Primary Examiner* — Anthony M Haughton
(74) *Attorney, Agent, or Firm* — JCIPRNET

(57) ABSTRACT

A support frame is suitable for supporting an electronic body. The support frame includes a movable element, an elastic element and a limiting element. The movable element includes a body and a cam structure. The cam structure is located on one end of the body, and the end is pivotally connected to the electronic body. The cam structure includes a first convex portion and a second convex portion. The elastic element is disposed in the electronic body and includes elastic pieces separated from each other. The limiting element is disposed in the electronic body and includes pins located on the elastic pieces. A rotational resistance of the movable element relative to the electronic body when the pins are slidably engaged against the first convex portion is different from a rotational resistance of the movable element when the pins are slidably engaged against the second convex portion.

10 Claims, 7 Drawing Sheets

(56) References Cited

U.S. PATENT DOCUMENTS

| | | | | |
|---|---|---|---|---|
| 8,964,382 | B2 * | 2/2015 | Ashcraft | G06F 1/166 361/679.56 |
| 9,229,477 | B2 * | 1/2016 | Morrison | G06F 1/1632 |
| 9,491,875 | B2 * | 11/2016 | Deng | H05K 5/0234 |
| 9,864,415 | B2 * | 1/2018 | Siddiqui | G06F 1/1679 |
| 11,079,800 | B2 * | 8/2021 | Fujii | G06F 1/166 |
| 2019/0212773 | A1 * | 7/2019 | Jiang | G06F 1/166 |

* cited by examiner

SUPPORT FRAME

CROSS-REFERENCE TO RELATED APPLICATION

This application claims the priority benefit of China application serial no. 202311601546.8, filed on Nov. 28, 2023. The entirety of the above-mentioned patent application is hereby incorporated by reference herein and made a part of this specification.

BACKGROUND

Technical Field

The disclosure relates to a support frame, and in particular relates to support frame suitable for supporting an electronic body.

Description of Related Art

When opening and closing a support frame that is generally used to hold up a display, tablet or mobile phone, the force of the spring piece may not be set properly, resulting in a large amount of force being required to switch between the open and closed states. In this case, when switching from open to closed, the support frame is likely to produce a loud impact sound with the housing; alternatively, as a result, only a small amount of force is required to switch between the open and closed states, making it difficult to maintain in the open state. The support frame is too prone to closure, which affects user experience and safety.

SUMMARY

A support frame that may improve safety and enhance user experience is provided in the disclosure.

The support frame of the disclosure is suitable for supporting an electronic body. The support frame includes a movable element, an elastic element, and a limiting element. The movable element includes a body and a cam structure. The cam structure is located on one end of the body, and the end is pivotally connected to the electronic body based on a pivot axis and located within the electronic body. The cam structure includes a first convex portion and a second convex portion disposed around the pivot axis. The elastic element is disposed in the electronic body and includes multiple elastic pieces separated from each other. The limiting element is disposed in the electronic body, and includes multiple pins separated from each other and disposed along an axial direction of the pivot axis. The pins are respectively located on the elastic pieces. A rotational resistance of the movable element relative to the electronic body when the pins are slidably engaged against the first convex portion is different from a rotational resistance of the movable element relative to the electronic body when the pins are slidably engaged against the second convex portion.

In an embodiment of the disclosure, the elastic pieces include a first elastic piece and two second elastic pieces. The first elastic piece is located between the second elastic pieces. The elastic element also includes a connecting portion. The connecting portion connects the first elastic piece and the second elastic pieces. The pins include a first pin and two second pins. The first pin is disposed on the first elastic piece, and the second pins are respectively located on the second elastic pieces.

In an embodiment of the disclosure, the first elastic piece, the second elastic pieces, and the connecting portion are integrally formed.

In an embodiment of the disclosure, the first elastic piece, the second elastic pieces, and the connecting portion have a comb-shaped structure.

In an embodiment of the disclosure, the first convex portion includes a first sub-convex portion and two second sub-convex portions disposed along the axial direction of the pivot axis. The first sub-convex portion is located between the second sub-convex portions. The first sub-convex portion has a radial length difference relative to each of the second sub-convex portions.

In an embodiment of the disclosure, a first radial length of the first sub-convex portion is greater than a second radial length of each of the second sub-convex portions.

In an embodiment of the disclosure, a friction coefficient between the first sub-convex portion of the first convex portion and the first pin is less than a friction coefficient between the second convex portion and the first pin.

In an embodiment of the disclosure, the cam structure further includes a first recessed portion and a second recessed portion. The first recessed portion is adjacent to the first convex portion, and the second recessed portion is adjacent to the second convex portion. When the pin is located in the first recessed portion, the movable element is in a closed position relative to the electronic body. When the pin is located in the second recessed portion, the movable element is in an open position relative to the electronic body.

In an embodiment of the disclosure, when viewed in cross-section, the first recessed portion and the first convex portion have a continuous curved profile, and the second recessed portion and the second convex portion have a continuous curved profile.

In an embodiment of the disclosure, when viewed in cross-section, a profile of the first convex portion is different from a profile of the second convex portion.

Based on the above, in the design of the support frame of the disclosure, the elastic element includes multiple elastic pieces separated from each other, and the pins of the limiting element are respectively located on the elastic pieces. A rotational resistance of the movable element relative to the electronic body when the pins are slidably engaged against the first convex portion is different from a rotational resistance of the movable element relative to the electronic body when the pins are slidably engaged against the second convex portion. Therefore, the support frame of the disclosure does not require a lot of force when switching from closed to open, and is not prone to closure after being opened, which may improve safety and enhance the user experience.

In order to make the above-mentioned features and advantages of the disclosure comprehensible, embodiments accompanied with drawings are described in detail below.

DETAILED DESCRIPTION OF DISCLOSED EMBODIMENTS

The disclosure may be understood by referring to the following detailed description in conjunction with the accompanying drawings. It should be noted that, for the ease of understanding by the readers and for the brevity of the accompanying drawings, multiple drawings in the disclosure only depict a portion of the electronic body. In addition, the number and size of each of the elements in the figures are for illustration purposes only, and are not intended to limit the scope of the present invention.

Figure 1:
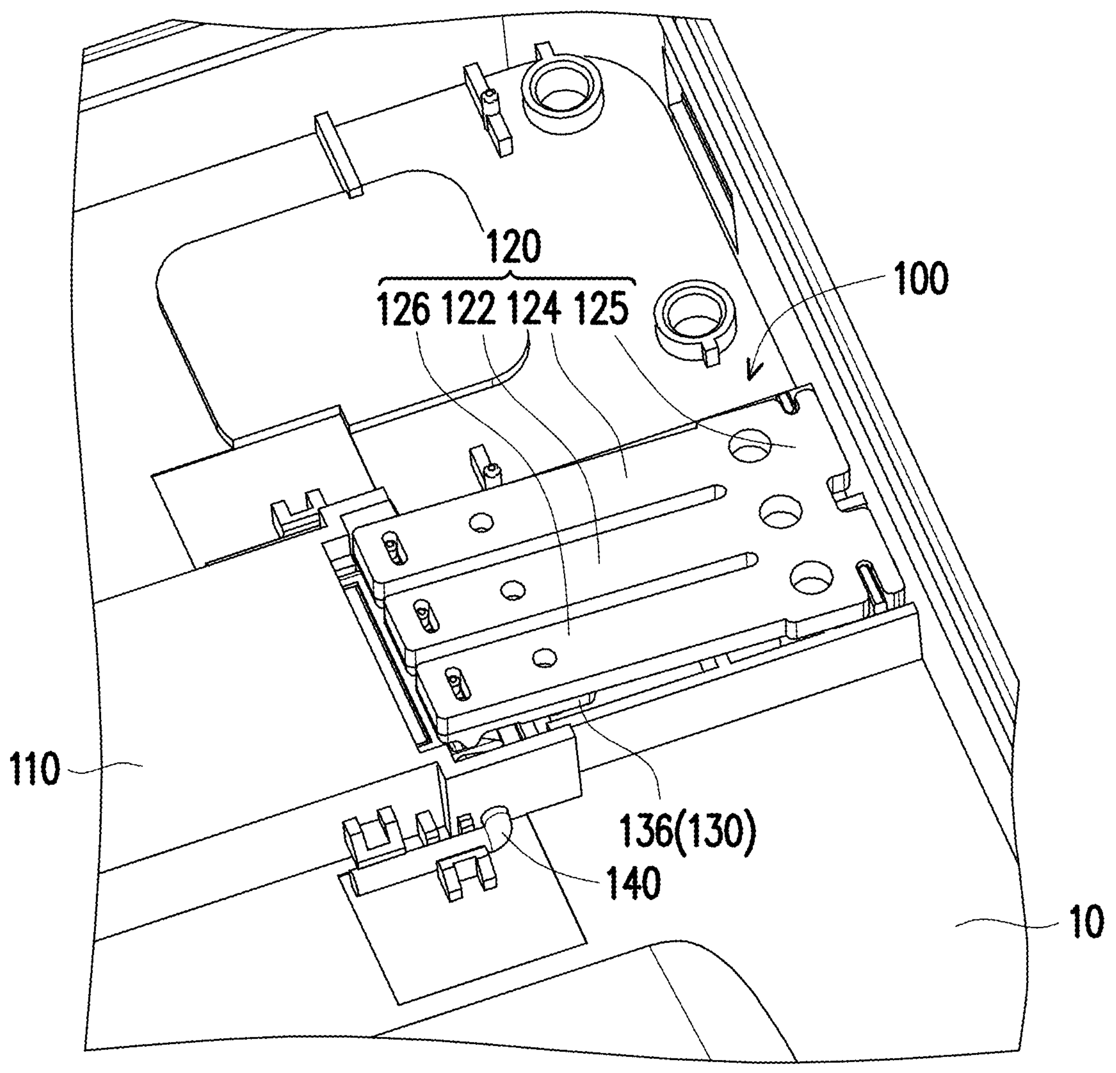
FIG. 1 is a top three-dimensional schematic diagram of a support frame for supporting an electronic body according to an embodiment of the disclosure.
Figure 2:
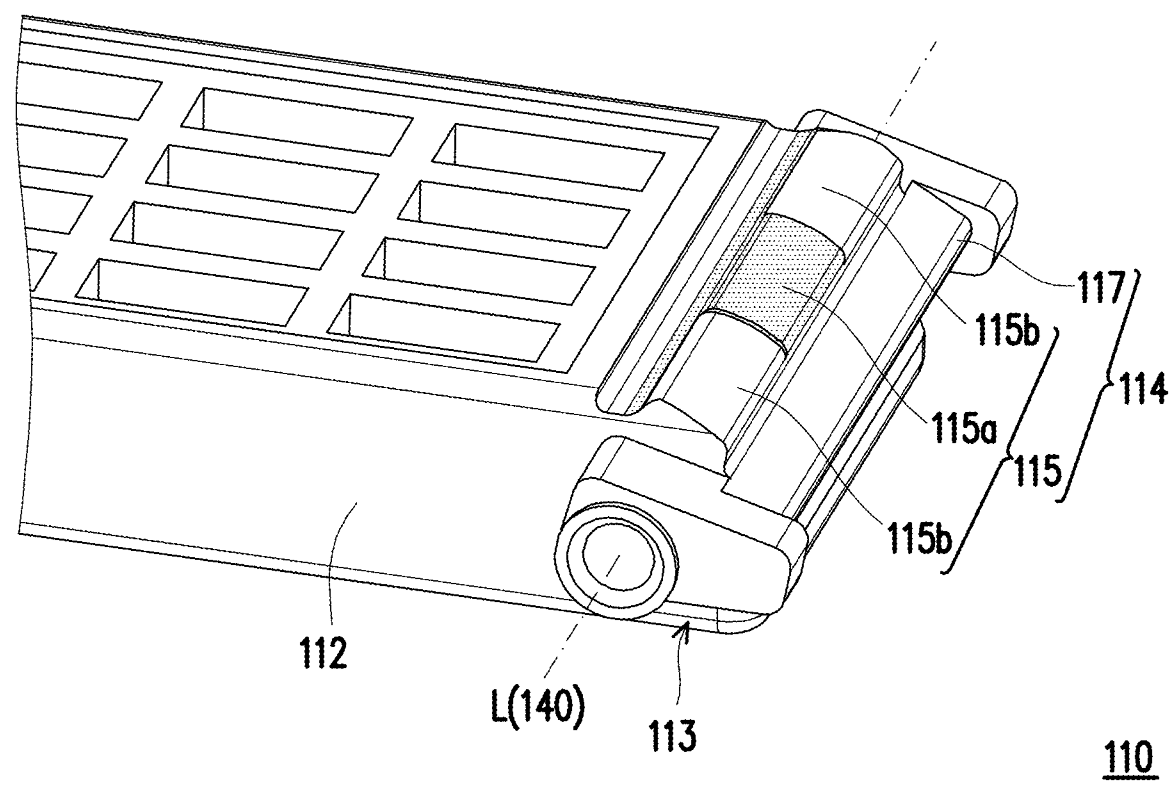
FIG. 2 is a three-dimensional schematic diagram of a movable element of the support frame of FIG. 1.
Figure 3:
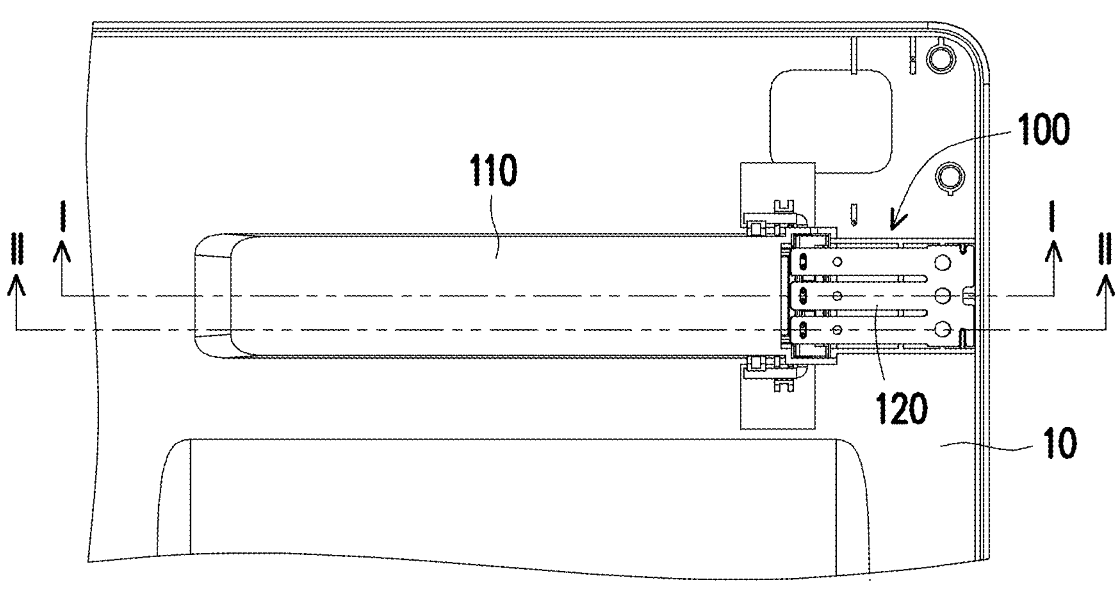
FIG. 3 is a top schematic diagram of FIG. 1.
Figure 4:
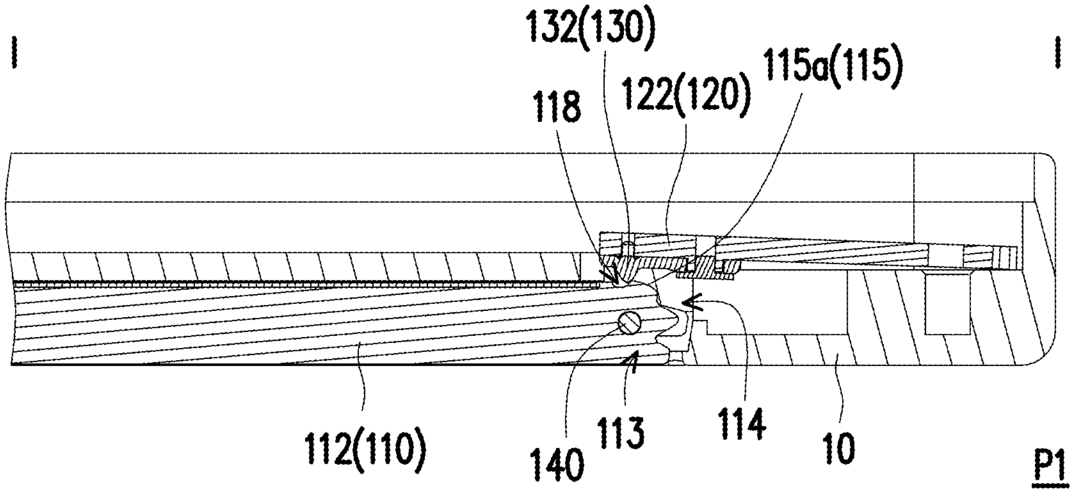
FIG. 4 is a cross-sectional schematic diagram of the support frame in a closed state along line I-I of FIG. 3.
Figure 5:
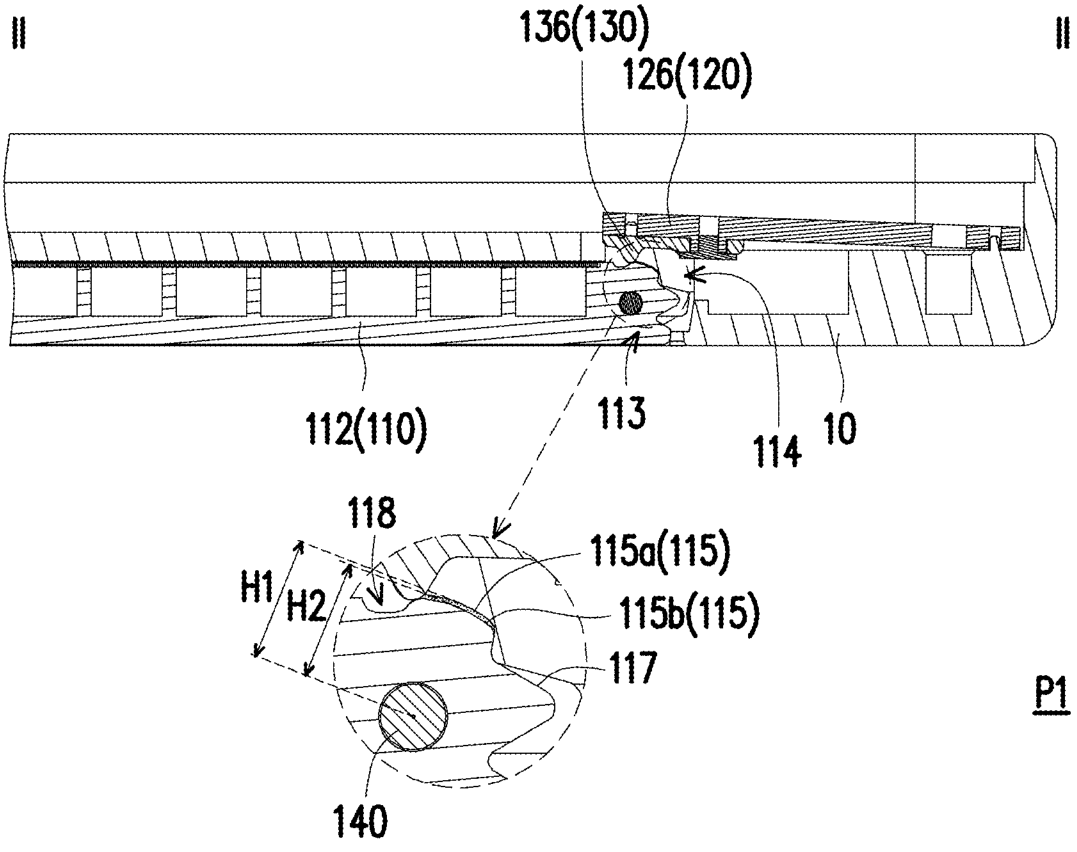
FIG. 5 is a cross-sectional schematic diagram of the support frame in a closed state along line II-II of FIG. 3.
Figure 6:
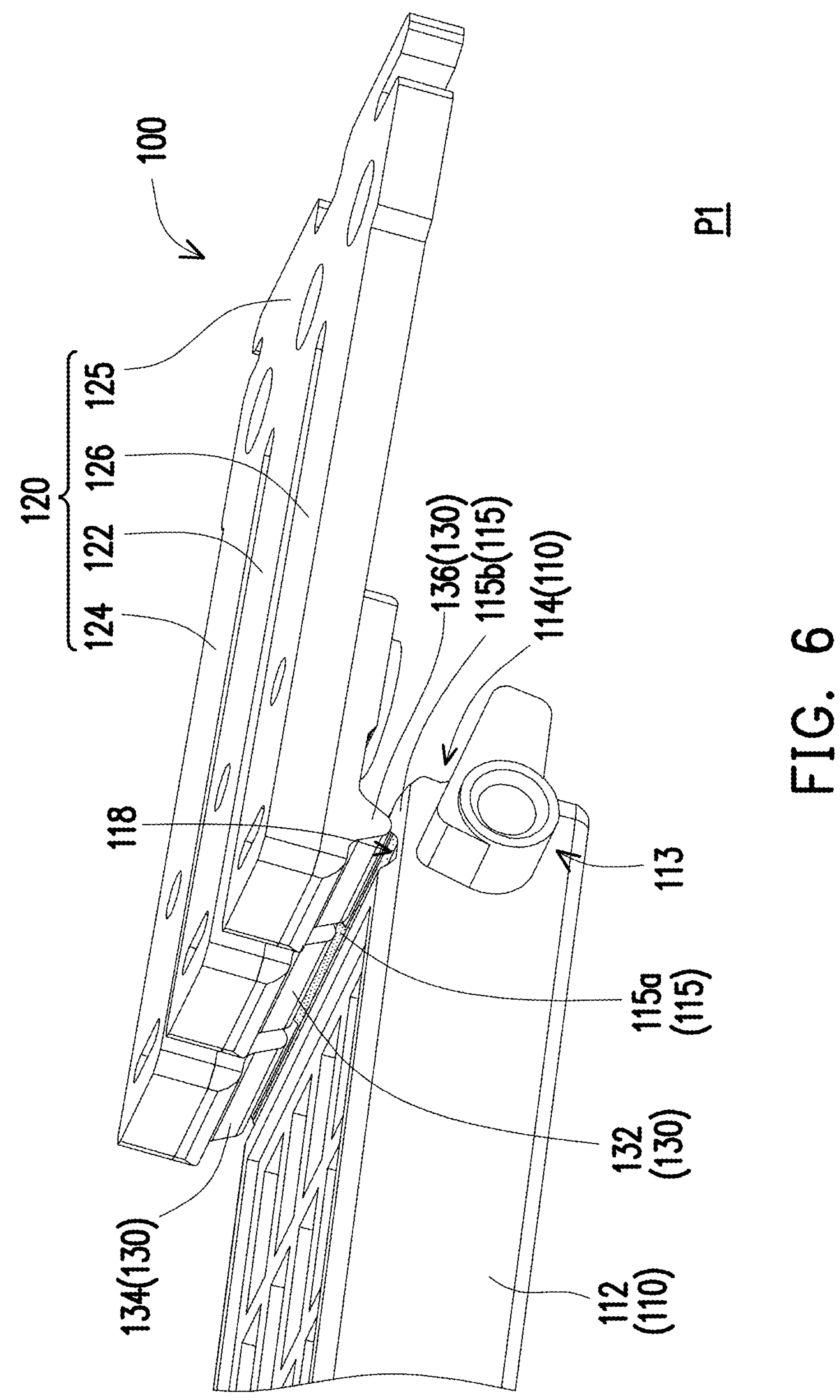
FIG. 6 is a three-dimensional schematic diagram of the support frame of FIG. 1 in a closed state.
Figure 7:
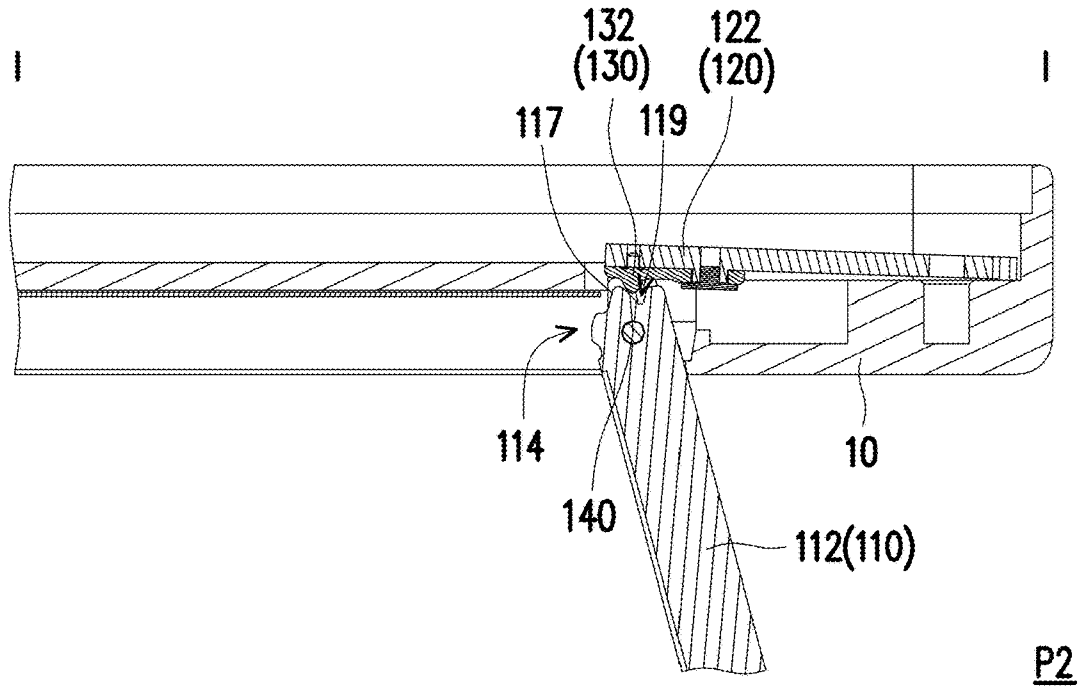
FIG. 7 is a cross-sectional schematic diagram of the support frame in an open state along line I-I of FIG. 3.
Figure 8:
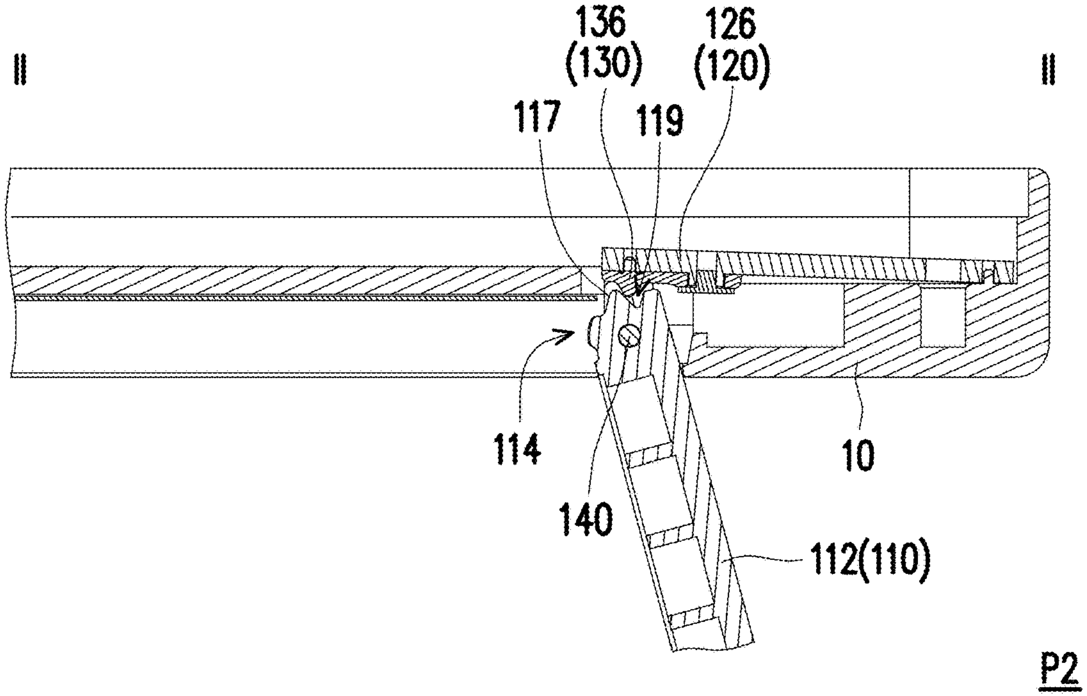
FIG. 8 is a cross-sectional schematic diagram of the support frame in an open state along line II-II of FIG. 3.
Figure 9:
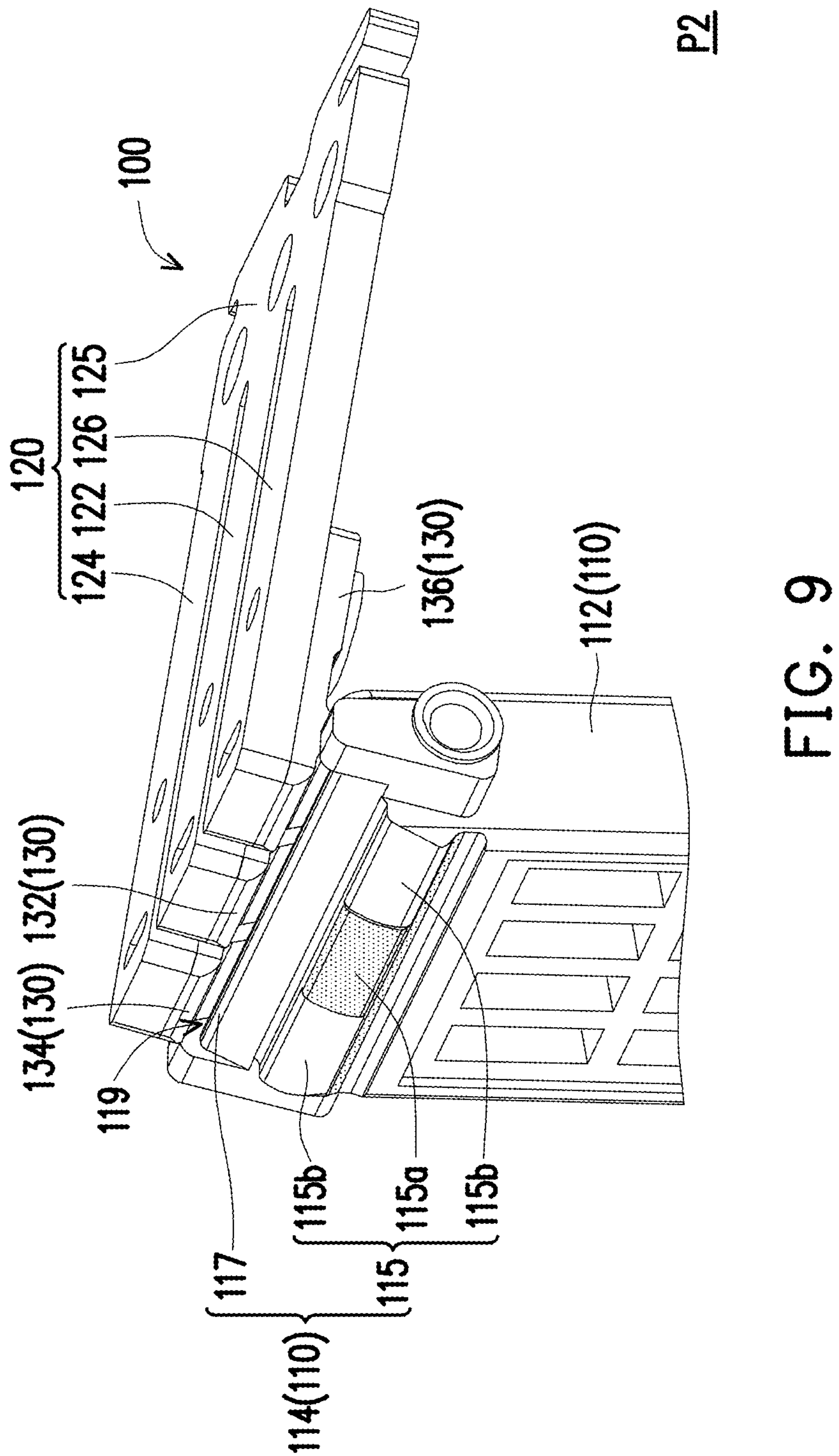
FIG. 9 is a three-dimensional schematic diagram of the support frame of FIG. 1 in an open state.

FIG. 1 is a top three-dimensional schematic diagram of a support frame for supporting an electronic body according to an embodiment of the disclosure. FIG. 2 is a three-dimensional schematic diagram of a movable element of the support frame of FIG. 1. FIG. 3 is a top schematic diagram of FIG. 1. FIG. 4 is a cross-sectional schematic diagram of the support frame in a closed state along line I-I of FIG. 3. FIG. 5 is a cross-sectional schematic diagram of the support frame in a closed state along line II-II of FIG. 3. FIG. 6 is a three-dimensional schematic diagram of the support frame of FIG. 1 in a closed state. FIG. 7 is a cross-sectional schematic diagram of the support frame in an open state along line I-I of FIG. 3. FIG. 8 is a cross-sectional schematic diagram of the support frame in an open state along line II-II of FIG. 3. FIG. 9 is a three-dimensional schematic diagram of the support frame of FIG. 1 in an open state.

Referring to FIG. 1, FIG. 2, and FIG. 6, in this embodiment, the support frame 100 is suitable for supporting an electronic body 10. The support frame 100 includes a movable element 110, an elastic element 120, and a limiting element 130. The movable element 110 includes a body 112 and a cam structure 114. The cam structure 114 is located on one end 113 of the body 112, and the end 113 is pivotally connected to the electronic body 10 based on a pivot axis 140 and located within the electronic body 10. The cam structure 114 includes a first convex portion 115 and a second convex portion 117 disposed around the pivot axis 140. The elastic element 120 is disposed in the electronic body 10 and includes multiple elastic pieces (schematically shown as three elastic pieces 122, 124, 126) separated from each other. The limiting element 130 is disposed in the electronic body 10 and includes multiple pins (schematically shown as three pins 132, 134, 136) separated from each other and disposed along an axis direction L of the pivot axis 140. The pins 132, 134, 136 are respectively located on the elastic pieces 122, 124, 126. A rotational resistance of the movable element 110 relative to the electronic body 10 when the pins 132, 134, 136 are slidably engaged against the first convex portion 115 is different from a rotational resistance of the movable element 110 relative to the electronic body 10 when the pins 132, 134, 136 are slidably engaged against the second convex portion 117.

Specifically, the electronic body 10 may be, for example, a monitor, a tablet, a mobile phone or a handwriting pad screen, but not limited thereto. The support frame 100 is assembled on the electronic body 10 to support the electronic body 10. Furthermore, the pivot axis 140 is connected to the electronic body 10 and passes through one end 113 of the movable element 110, in which the movable element 110 rotates relative to the electronic body 10 with the pivot axis 140 as the axis center. Here, the movable element 110 is, for example, a stand, which may support the electronic body 10 to stand when it is opened.

Next, the so-called cam is a component with a curved profile or groove. Referring to FIG. 2 to FIG. 5 at the same time, the cam structure 114 of the movable element 110 of this embodiment includes a first convex portion 115 and a second convex portion 117. The first convex portion 115 and the second convex portion 117 are respectively located on different axial cross-sections. When viewed in cross-section, a profile of the first convex portion 115 is different from a profile of the second convex portion 117. In one embodiment, the cross-sectional profile of the first convex portion 115 is, for example, rectangular-like, and the cross-sectional profile of the second convex portion 117 is, for example, triangular-like, but not limited thereto.

Furthermore, the first convex portion 115 includes a first sub-convex portion **115*a* and two second sub-convex portions 115*b* disposed side by side with each other along the axis direction L of the pivot axis 140. The first sub-convex portion 115*a* is located between the second sub-convex portions 115*b*, and the first sub-convex portion 115*a* has a radial length difference relative to each of the second sub-convex portions 115*b*. As shown in FIG. 5, a first radial length H1 of the first sub-convex portion 115*a* is greater than a second radial length H2 of each of the second sub-convex portions 115*b*. Here, the first radial length H1 refers to the radial dimension (distance) of the highest point of the first sub-convex portion 115*a* relative to the axis center of the pivot axis 140, and the second radial length H2 refers to the radial dimension (distance) of the highest point of the second sub-convex portion 115*b* relative to the axis center of the pivot axis 140. That is, at the same axial cross-section, the radial dimensions of the first sub-convex portion 115*a* and the second sub-convex portion 115*b*** are different, that is, there is a radial dimension difference between them.

In addition, referring to FIG. 4, FIG. 5, FIG. 7 and FIG. 8 at the same time, the cam structure 114 of this embodiment further includes a first recessed portion 118 and a second recessed portion 119. The first recessed portion 118 is adjacent to the first convex portion 115 and makes a smooth transition, while the second recessed portion 119 is adjacent to the second convex portion 117 and makes a smooth transition. The so-called smooth transition means that the adjacent convex portion and the recessed portion are co-tangent at the connection point, or it may also be understood that the curvature at the connection point is the same, so that when the elastic element is slidably engaged, it may transition from one part to another smoothly and without lag. In other words, when viewed in cross-section, the first recessed portion 118 and the first convex portion 115 have a continuous curved profile, and the second recessed portion 119 and the second convex portion 117 have a continuous curved profile.

In one embodiment, the cam structure may be a disc-shaped cam, which means that the cam is a disc-shaped component that rotates around a fixed axis and has a changing radius, but not limited thereto. In another embodiment, the cam structure may be a moving cam, which means that the cam moves linearly relative to the frame, and the cam structure is drivingly connected to the body, but not limited thereto. In another embodiment, the cam structure may be a cylindrical cam, which means that the cam is a cylinder, which may be regarded as rolling the moving cam into a cylinder, but not limited thereto.

Referring to FIG. 1 again, the elastic pieces 122, 124, 126 of the elastic element 120 in this embodiment include a first elastic piece 122 and two second elastic pieces 124, 126, in which the first elastic piece 122 is located between the second elastic pieces 124, 126. Furthermore, the elastic element 120 further includes a connecting portion 125, which connects the first elastic piece 122 and the second elastic pieces 124, 126. In one embodiment, the first elastic piece 122, the second elastic pieces 124, 126, and the connecting portion 125 may be an integrally formed structure. In one embodiment, the first elastic piece 122, the second elastic pieces 124, 126, and the connecting portion 125 may have a comb-shaped structure. That is, there is a gap between the first elastic piece 122 and the second elastic pieces 124, 126, while the first elastic piece 122 and the second elastic piece 124, 126 are respectively strip-shaped or elongated structures, and the first elastic piece 122 and the second elastic pieces 124, 126 are connected through the connecting portion 125 to form a comb-shaped structure. In one embodiment, the material of the elastic element 120 may be, for example, metal, alloy, plastic, silicone or rubber, but not limited thereto.

Referring to FIG. 6 again, the pins 132, 134, 136 of this embodiment include a first pin 132 and two second pins 134, 136. The first pin 132 is disposed on the first elastic piece 122 and located between the first elastic piece 122 and the cam structure 114. The second pin 134 is located on the second elastic piece 124 and between the second elastic piece 124 and the cam structure 114. The second pin 136 is located on the second elastic piece 126 and between the second elastic piece 126 and the cam structure 114. The first pin 132 and the second pins 134, 136 are respectively fixed to the first elastic piece 122 and the second elastic pieces 124, 126, in which the fixing method includes adhesion, magnetic attraction, locking, or other appropriate methods.

In one embodiment, the first pin 132 and the second pins 134,136 may each have a triangular pyramid structure, but not limited thereto. In one embodiment, the first pin 132 and the second pins 134, 136 may each be formed of a flat plate portion and an interference portion connected to the flat plate portion, in which the interference portion may protrude relative to the flat plate portion, and the flat plate portion and the interference portion may be an integrally formed structure, but not limited thereto. In one embodiment, the materials of the first pin 132 and the second pins 134, 136 may include plastic, silicone, rubber, or magnetic materials, but not limited thereto.

Generally speaking, when the support frame 100 is in the closed state, only a small force is required to maintain the closure; when in the open state, a large force is required to prevent automatic closing. In addition, the support frame 100 also needs to be designed through a mechanism so that the movable element 110 may be fixed at a specific position when closed or open, so as to achieve the purpose of small volume and low cost.

Referring to FIG. 3, FIG. 4, FIG. 5, and FIG. 6 at the same time, when the first pin 132 and the second pins 134, 136 respectively slidably engage against the first sub-convex portion 115*a* and the second sub-convex portion 115*b* of the cam structure 114 and are located in the first recessed portion 118, the movable element 110 rotates to a closed position P1 relative to the electronic body 10 with a first force. Next, referring to FIG. 3, FIG. 7, FIG. 8, and FIG. 9 at the same time, when the first pin 132 and the second pins 134, 136 engage against the second convex portion 117 of the cam structure 114 and are located in the second recessed portion 119, the movable element 110 rotates to an open position P2 relative to the electronic body 10 with a second force. In one embodiment, a friction coefficient between the first sub-convex portion 115*a* of the first convex portion 115 and the first pin 132 is, for example, less than a friction coefficient between the second convex portion 117 and the first pin 132. That is, the second force is, for example, greater than the first force.

In other words, the first elastic piece 122 in the middle is matched with the first sub-convex portion 115*a* of the first convex portion 115 in the cam structure 114 with a higher height, while the second elastic pieces 124, 126 on two sides are matched with the second sub-convex portions 115*b* of the first convex portion 115 in the cam structure 114 with a lower height to provide a smaller closed state force. On the other hand, the first elastic piece 122 in the middle and the second elastic pieces 124, 126 on two sides match with the second convex portion 117 in the cam structure 114 to provide greater open state force. With this design, the movable element 110 is less labor-intensive when switching from closed to open, and is more stable when maintaining the open state. In short, the support frame 100 of this embodiment distinguishes the difference in the elastic force applied when closing or opening through structural settings, so that it does not require a lot of force when switching from closed to open, and it is not prone to closure when switching from closed to open, which may improve safety and user experience.

It is worth mentioning that if there is enough space, the elastic element 120 may also be designed like comb teeth in a music box, with more than three elastic pieces (e.g., four elastic pieces or more), and set as three, four or more sections of force by matching the cam structure 114 of the movable element 110, which is not limited thereto.

For example, in an embodiment not shown, the second convex portion may also have a structure similar to the first convex portion, that is, the second convex portion may include a third sub-convex portion and two fourth sub-convex portions arranged along the axial direction of the pivot axis, in which the third sub-convex portion is located between the two fourth sub-convex portions. The radial dimension of the third sub-convex portion may be dimension than the radial dimension of the fourth sub-convex portion, so that the engagement force between the sub-convex portions on two sides and the pin is slightly smaller, which facilitates the stable, and smooth sliding transition without jamming of the elastic piece. The radial dimension of the first sub-convex portion may be less than the radial dimension of the third sub-convex portion, and the radial dimension of the second sub-convex portion may be less than the radial dimension of the fourth sub-convex portion. The third sub-convex portion may correspond to the first elastic piece, and the two fourth sub-convex portions correspond to the two second elastic pieces. In this way, the rotational resistance when the pin is engaged against the first convex portion is less than the rotational resistance when the pin is engaged against the second convex portion. In one embodiment, the first radial dimension difference between the first sub-convex portion and the second sub-convex portion is different from the second radial dimension difference between the third sub-convex portion and the fourth sub-convex portion, so that the sub-convex portions on two sides ensure that the elastic piece may slide smoothly and without jamming, and the rotational resistance is adjusted by the sub-convex portion in the middle. For example, the second convex portion 117 in FIG. 9 corresponds to the special situation in which the second radial dimension difference of the third sub-convex portion relative to the fourth sub-convex portion is zero. In another embodiment, the friction coefficient between the first sub-convex portion and the first pin is less than the friction coefficient between the third sub-convex portion and the first pin.

In one embodiment, the opening and closing force may be designed by altering the height of the first convex portion 115 and the second convex portion 117 of the cam structure 114, or the slope of the first convex portion 115 and the second convex portion 117, or the depth of the groove formed between multiple convex portions (e.g., the first convex portion 115 and the second convex portion 117) of the cam structure 114. In one embodiment, the movable element 110 may be fixed in the closed position P1 or the open position P2, for example, through the first pin 132 and the second pin 134, 136 being fixed in different recessed portions, in which the recessed portion may be, for example, recessed portions of different depths formed between the convex portions of the cam structure, but not limited thereto. In one embodiment, the included angle between the two recessed portions may be, for example, approximately 90 degrees, but not limited thereto.

To sum up, in the design of the support frame of the disclosure, the elastic element includes multiple elastic pieces separated from each other, and the pins of the limiting element are respectively located on the elastic pieces. A rotational resistance of the movable element relative to the electronic body when the pins are slidably engaged against the first convex portion is different from a rotational resistance of the movable element relative to the electronic body when the pins are slidably engaged against the second convex portion. Therefore, the support frame of the disclosure does not require a lot of force when switching from closed to open, and is not prone to closure after being opened, which may improve safety and enhance the user experience.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A support frame, suitable for supporting an electronic body, the support frame comprising:

a movable element, comprising a body and a cam structure, wherein the cam structure is located on one end of the body, and the end is pivotally connected to the electronic body based on a pivot axis and located within the electronic body, the cam structure comprises a first convex portion and a second convex portion disposed around the pivot axis;

an elastic element, disposed in the electronic body and comprising a plurality of elastic pieces separated from each other; and a limiting element, disposed in the electronic body, and the limiting element comprising a plurality of pins separated from each other and disposed along an axial direction of the pivot axis, wherein the pins are respectively located on the elastic pieces, a rotational resistance of the movable element relative to the electronic body when the pins are slidably engaged against the first convex portion is different from a rotational resistance of the movable element relative to the electronic body when the pins are slidably engaged against the second convex portion.

2. The support frame according to claim 1, wherein the elastic pieces comprise a first elastic piece and two second elastic pieces, wherein the first elastic piece is located between the second elastic pieces, the elastic element further comprises a connecting portion, the connecting portion connects the first elastic piece and the second elastic pieces, the pins comprise a first pin and two second pins, the first pin is disposed on the first elastic piece, and the second pins are respectively located on the second elastic pieces.

3. The support frame according to claim 2, wherein the first elastic piece, the second elastic pieces, and the connecting portion are integrally formed.

4. The support frame according to claim 3, wherein the first elastic piece, the second elastic pieces, and the connecting portion have a comb-shaped structure.

5. The support frame according to claim 2, wherein the first convex portion comprises a first sub-convex portion and two second sub-convex portions disposed along the axial direction of the pivot axis, the first sub-convex portion is located between the second sub-convex portions, the first sub-convex portion has a radial length difference relative to each of the second sub-convex portions.

6. The support frame according to claim 5, wherein a first radial length of the first sub-convex portion is greater than a second radial length of each of the second sub-convex portions.

7. The support frame according to claim 5, wherein a friction coefficient between the first sub-convex portion of the first convex portion and the first pin is less than a friction coefficient between the second convex portion and the first pin.

8. The support frame according to claim 1, wherein the cam structure further comprises a first recessed portion and a second recessed portion, wherein the first recessed portion is adjacent to the first convex portion, and the second recessed portion is adjacent to the second convex portion, when the pins are located in the first recessed portion, the movable element is in a closed position relative to the electronic body, and when the pins are located in the second recessed portion, the movable element is in an open position relative to the electronic body.

9. The support frame according to claim 8, wherein when viewed in cross-section, the first recessed portion and the first convex portion have a continuous curved profile, and the second recessed portion and the second convex portion have a continuous curved profile.

10. The support frame according to claim 1, wherein when viewed in cross-section, a profile of the first convex portion is different from a profile of the second convex portion.

* * * * *